United States Patent [19]
Hyuga et al.

[11] Patent Number: 5,933,439
[45] Date of Patent: Aug. 3, 1999

[54] ETALON AND SINGLE LONGITUDINAL MODE LASER

[75] Inventors: Hiroaki Hyuga; Yoji Okazaki, both of Kanagawa-ken, Japan

[73] Assignee: Fuji Photo Film Co., Ltd., Kanagawa-Ken, Japan

[21] Appl. No.: 08/877,515

[22] Filed: Jun. 17, 1997

[30] Foreign Application Priority Data

Jun. 18, 1996 [JP] Japan ................... 8-156734

[51] Int. Cl.⁶ .................... H01S 3/098
[52] U.S. Cl. .................... 372/19; 372/98
[58] Field of Search ................... 372/9, 18–22, 372/98, 99, 108

[56] References Cited

U.S. PATENT DOCUMENTS

| | | | |
|---|---|---|---|
| 4,756,606 | 7/1988 | Jewell et al. | 372/21 X |
| 4,797,893 | 1/1989 | Dixon | 372/19 X |
| 4,995,048 | 2/1991 | Kuindersma et al. | 372/20 X |
| 5,278,851 | 1/1994 | Goto | 372/19 |
| 5,298,351 | 3/1994 | Bobroff et al. | 430/5 |
| 5,583,683 | 12/1996 | Scobey | 359/127 |
| 5,657,341 | 8/1997 | Hyuga | 372/98 |

OTHER PUBLICATIONS

"Optic Letters" vol. 18 (Mar. 1993) pp. 420–422, C.S. Adams et al, "Single–Frequency Operation of a Diode–Pumped Lanthanum–Neodymium–Hexaaluminate Laser By . . . ".

*Primary Examiner*—John D. Lee
*Attorney, Agent, or Firm*—Sughrue, Mion, Zinn, Macpeak & Seas, PLLC

[57] ABSTRACT

An etalon is disposed in a resonator of a laser to make the laser oscillate in a single longitudinal mode. Opposite end faces of the etalon through which light travels are provided with coating by ion-assisted deposition to prevent output fluctuations of the laser due to changes in environmental moisture and/or aging of the laser. Preferably the coating is of $HfO_2$ and $SiO_2$. In accordance with a second aspect of the present invention, there is provided a single longitudinal mode laser comprising a resonator and an etalon which is disposed in the resonator to make the laser oscillate in a single longitudinal mode, wherein the improvement comprises that opposite end faces of the etalon through which light travels are provided with coating by ion-assisted deposition. Further, the resonator may be contained in an airtight casing.

6 Claims, 3 Drawing Sheets

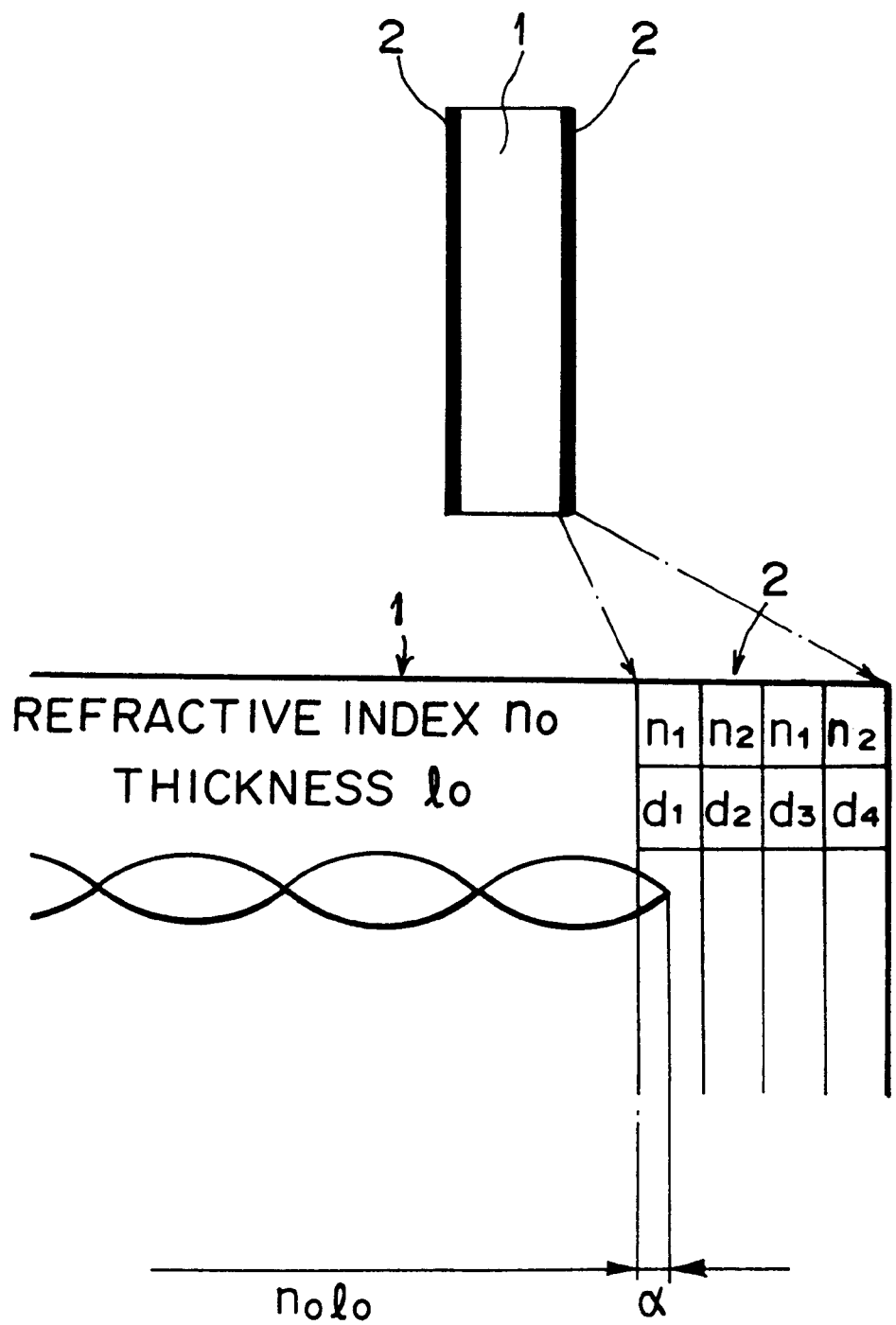

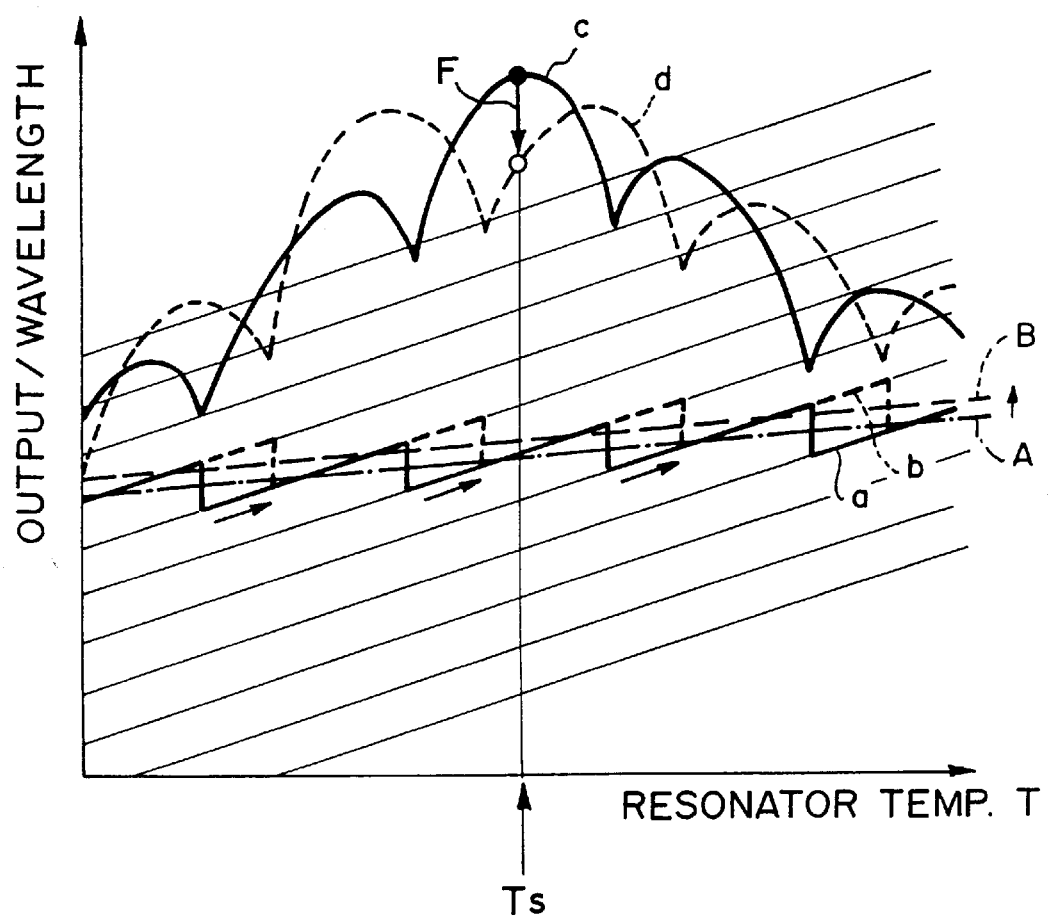

ETALON AND SINGLE LONGITUDINAL MODE LASER

BACKGROUND OF THE INVENTION

1. Field of the Invention

This invention relates to an etalon which is disposed in a laser resonator to make the laser oscillate in a single longitudinal mode and a laser which oscillates in a single longitudinal mode by virtue of the etalon.

2. Description of the Related Art

There has been known a solid state laser in which a solid state laser rod doped with a rare earth metal such as neodymium is pumped with a laser beam emitted from a semiconductor laser (laser diode).

In such a laser, it has been put into practice to dispose an etalon in the resonator as a wavelength selector in order to suppress generation of mode competition noise, thereby making the oscillation mode of the laser a single longitudinal mode. See, for instance, "Optics Letters, Vol.18 (1993) p.420".

However in a laser in which an etalon is disposed in the resonator in order to obtain a single longitudinal mode oscillation, there has been a problem that the output of the laser greatly fluctuates due to change in the environmental moisture and/or aging of the laser.

SUMMARY OF THE INVENTION

In view of the foregoing observations and description, the primary object of the present invention is to provide an etalon which can prevent fluctuation in the output of the laser due to change in the environmental moisture and/or aging of the laser.

Another object of the present invention is to provide a single longitudinal mode laser whose output does not fluctuate due to change in the environmental moisture and/or aging of the laser.

In accordance with a first aspect of the present invention, there is provided an etalon, which is disposed in a resonator of a laser to make the laser oscillate in a single longitudinal mode, characterized in that opposite end faces of the etalon through which light travels are provided with coating by ion-assisted deposition.

Preferably the coating is of $HfO_2$ and $SiO_2$.

In accordance with a second aspect of the present invention, there is provided a single longitudinal mode laser comprising a resonator and an etalon which is disposed in the resonator to make the laser oscillate in a single longitudinal mode, wherein the improvement comprises that opposite end faces of the etalon through which light travels are provided with coating by ion-assisted deposition.

Preferably the resonator is contained in an air-tight casing.

Our investigation has revealed that said problem of fluctuation in the output of the conventional single longitudinal mode laser due to change in the environmental moisture and aging of the laser is more apt to arise when an etalon having coating formed by conventional electron beam deposition. This point will be described in detail hereinbelow.

Relation between the effective optical thickness nd (n representing the refractive index of the coating material and d representing the thickness of the coating) of the coating on the etalon and the output of the laser will be described first. It is assumed that the etalon is formed by forming coating 2 on opposite end faces of a substrate 1 whose refractive index and thickness are $n_0$ and $l_0$, respectively as shown in FIG. 3. Further it is assumed that coating materials of type A and type B are used, the refractive index of the coating materials being $n_1$ and $n_2$ respectively and thickness of each coating being $d_i$.

When the coating 2 is formed on the substrate 1, the reflecting phase becomes not 0 and accordingly effective reflecting point is shifted from the end face of the substrate 1. When the amount of shift is represented by α, the effective optical length L of the etalon is represented as follows.

$$L = n_0 \cdot l_0 + 2 \cdot \alpha$$

The value of α changes with the refractive index $n_i$ of the coating material and thickness $d_i$ of the coating 2 and when the value of α changes, the effective optical length L of the etalon naturally changes. The refractive index $n_i$ of the coating material and thickness $d_i$ of the coating 2 which change the effective optical length L of the etalon, especially the refractive index $n_i$ of the coating material, are changed with change in the environmental moisture and with aging.

The resonant wavelength λ of the etalon is represented by formula $\lambda = \lambda_0(L/L_0)$, wherein $\lambda_0$ and $L_0$ respectively represent the resonant wavelength and the effective optical length in a reference state. Accordingly the resonant wavelength λ of the etalon changes due to change in the environmental moisture and aging.

Influence of the change in the resonant wavelength λ of the etalon on the output of the laser will be discussed hereinbelow. Dependence of the output and the oscillation wavelength of a laser on the temperature T of the resonator is basically as shown in FIG. 4. In FIG. 4, lines a and b show the oscillation wavelengths of the laser, lines c and d show the outputs of the laser and lines A and B show the resonant wavelengths of the etalon. Lines A, a and c respectively show the resonant wavelength of the etalon, the oscillation wavelength of the laser and the output of the laser in the reference state of environment and lines B, b and d show those in a different state of environment (under the moisture different from the reference state of environment).

As can be seen from FIG. 4, when the resonant wavelength of the etalon changes from that shown by line A to that shown by line B, the oscillation wavelength and the output of the laser change from those shown by the solid lines a and c to those shown by the broken lines b and d and accordingly the output of the laser at a set temperature Ts of the resonator changes as shown by arrow F. Influence of aging on the output of the laser is similar to that of the change in the environmental moisture described above.

Specifically when a conventional etalon having $HfO_2/SiO_2$ coating formed by conventional electron beam deposition is employed, the resonant wavelength of the etalon is elongated by 0.03 nm with change in the environmental moisture from 0% to 80%, which can result in reduction of the output of the laser by 10%.

To the contrast, when an etalon of the present invention having $HfO_2/SiO_2$ coating formed by ion-assisted deposition is employed, change in the resonant wavelength of the etalon is only 0.006 nm at most with change in the environmental moisture from 0% to 80%, whereby change in the output of the laser can be not more than 2%.

BRIEF DESCRIPTION OF THE DRAWINGS

FIG. 3 is a schematic view for illustrating the effective optical length of the etalon, and FIG. 4 is a graph showing dependence of the output and the oscillation wavelength of a laser on the temperature of the resonator.

DESCRIPTION OF THE PREFERRED EMBODIMENTS

Figure 1:
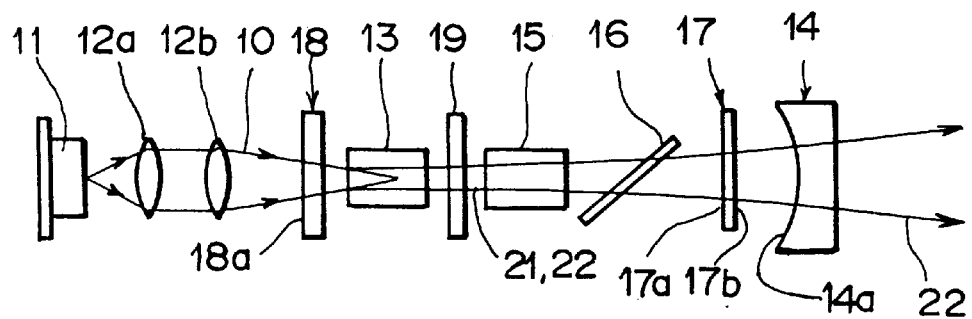
FIG. 1 is a schematic side view of a solid state laser in accordance with an embodiment of the present invention.

In FIG. 1, a laser diode pumped solid state laser in accordance with an embodiment of the present invention comprises a semiconductor laser 11 which emits a laser beam 10 as a pumping beam, a pair of condenser lenses 12a and 12b which condenses the laser beam 10 which is divergent light, an Nd:YLF crystal 13, that is, a YLF crystal doped with neodymium (Nd), a resonator mirror 14 disposed in front of the Nd:YLF crystal 13 (on the side of the Nd:YLF crystal 13 remote from the semiconductor laser 11), a MgO:LN crystal (LiNbO$_3$ crystal doped with MgO) 15, which is a nonlinear optical element having periodic domain reversals, disposed between the Nd:YLF crystal 13 and the resonator mirror 14, and a Brewster's plate 16 for controlling polarization and a solid etalon 17 which are disposed between the MgO:LN crystal 15 and the resonator mirror 14. A pair of $\lambda/4$ plates 18 and 19 for instance of quartz making the oscillation mode a twist mode are disposed on opposite sides of the Nd:YLF crystal 13.

These elements are mounted on a common casing (not shown) into a unit. The resonator of the laser diode pumped solid state laser is formed by the $\lambda/4$ plate 18 and the resonator mirror 14 as will be described later. The resonator and the semiconductor laser 11 are kept at respective predetermined temperatures by a temperature control means not shown.

The semiconductor laser 11 emits a laser beam 10 of a wavelength of 797 nm. The Nd:YLF crystal 13 cut along a c axis generates a laser beam having a wavelength of 1314 nm when neodium ions are pumped by the laser beam 10.

The light incident end face 18a of the $\lambda/4$ plate 18 is provided with coating which is highly reflective for light of 1314 nm (reflectance of not smaller than 99.9%) and highly transmissive for the pumping laser beam 10 of 797 nm (transmittance of not smaller than 93%).

The mirror surface 14a of the resonator mirror 14 is provided with coating which is highly reflective for light of 1314 nm (reflectance of not smaller than 99.9%) and highly transmissive for a laser beam 10 of 657 nm (transmittance of not smaller than 90%).

Light of 1314 nm is confined between the light incident end face 18a of the $\lambda/4$ plate 18 and the mirror surface 14a and causes laser oscillation to generate a laser beam 21 of 1314 nm. The MgO:LN crystal 15 converts the laser beam 21 to its second harmonic 22 having a wavelength of 657 nm. The second harmonic 22 mainly emanates from the resonator mirror 14.

The $\lambda/4$ plates 18 and 19 are positioned so that their crystal axes are at 90° relative to each other, whereby the laser beam 21 is twisted between the $\lambda/4$ plates 18 and 19. By virtue of the $\lambda/4$ plates 18 and 19 and the solid etalon 17 which functions as a wavelength selector, the laser beam 21 oscillates in a single longitudinal mode and accordingly the second harmonic 22 also oscillates in a single longitudinal mode.

Opposite end faces 17a and 17b of the etalon 17 through which light travels are provided with coating by ion-assisted deposition. The coating comprises alternative layers of HfO$_2$ having a high refractive index and SiO$_2$ having a low refractive index. The coating exhibits a reflectance of 30% for the laser beam 21 of 1314 nm and reflectance of not larger than 0.5% for the second harmonic 22 of 657 nm.

As described in detail above, the etalon 17 provided with coating by ion-assisted deposition can prevent fluctuation in the output of the laser 21 due to change in the environmental moisture and/or aging of the laser, which results in stable output of the second harmonic 22.

Specifically when a conventional etalon having coating formed by conventional electron beam deposition was employed in place of the aforesaid etalon 17, the output of the second harmonic 22 was reduced by 10% with change in the environmental moisture from 0% to 80%. To the contrast, in the case of the laser of the embodiment described above, reduction in the output of the second harmonic 22 with change in the environmental moisture from 0% to 80% was only 2% at most.

Figure 2:
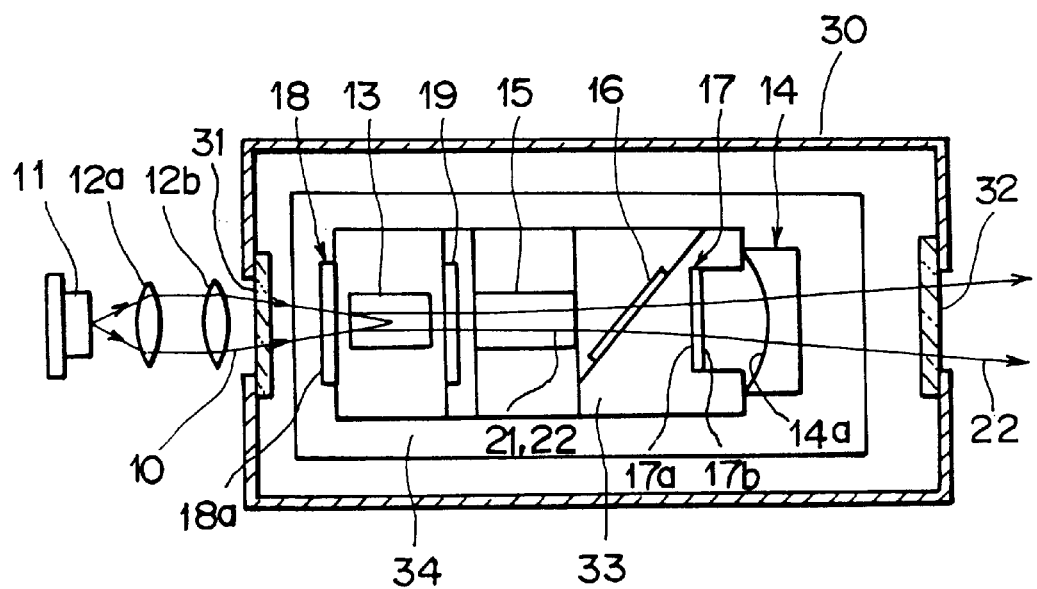
FIG. 2 is a schematic side view of a solid state laser in accordance with another embodiment of the present invention.

A laser diode pumped solid state laser in accordance with another embodiment of the present invention will be described with reference to FIG. 2, hereinbelow. The laser diode pumped solid state laser of this embodiment differs from the preceding embodiment only in that the resonator is enclosed in an air-tight package 30. In FIG. 2, the elements analogous to those in FIG. 1 are given the same reference numerals and will not be described here.

In FIG. 2, reference numerals 31 to 34 respectively denote a pumping beam inlet window, a second harmonic output window, an optical part fixture and a Peltier element for temperature control.

In this embodiment, since the resonator is contained in the air-tight package 30, the solid etalon 17 is not subjected to change in the environmental moisture and accordingly fluctuation in the output of the second harmonic 22 due to change in the environmental moisture can be almost perfectly suppressed.

Further since the solid etalon 17 is provided with coating by ion-assisted deposition, fluctuation of the second harmonic 22 due to aging also can be suppressed.

The present invention can be applied to various types of lasers so long as an etalon is employed as a wavelength selector. Further various solid laser media, pumping light sources, nonlinear optical materials for wavelength conversion and the like need not be limited to those described above in conjunction with the embodiments.

What is claimed is:

1. An etalon, which is disposed in a resonator of a laser to make the laser oscillate in a single longitudinal mode, comprising:

a substrate; and first and second coating layers formed by ion-assisted deposition on opposite end faces of the substrate through which light travels.

2. An etalon as defined in claim 1, wherein the first and second coating layers comprise HfO$_2$ and SiO$_2$.

3. A single longitudinal mode laser comprising:

a resonator; and an etalon which is disposed in the resonator to make the laser oscillate in a single longitudinal mode, wherein opposite end faces of the etalon through which light travels are provided with coating layers formed by ion-assisted deposition.

4. A single longitudinal mode laser as defined in claim 3, wherein the resonator is completely contained in an air-tight casing.

5. A single longitudinal mode laser as recited in claim 3, wherein the resonator comprises means for controlling polarization of the laser and the laser is linearly polarized.

6. A single longitudinal mode laser as recited in the claim 5, wherein the resonator comprises a crystal for converting a wavelength of the laser and the laser is a wavelength conversion laser.

* * * * *